United States Patent
Abedini et al.

(10) Patent No.: US 12,323,219 B2
(45) Date of Patent: Jun. 3, 2025

(54) REPEATERS CAPABLE OF SIMULTANEOUS REPEATING OPERATION AND POWER DETECTION

(71) Applicant: QUALCOMM Incorporated, San Diego, CA (US)

(72) Inventors: Navid Abedini, Basking Ridge, NJ (US); Jianghong Luo, Skillman, NJ (US); Muhammad Nazmul Islam, Littleton, MA (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 18/295,804

(22) Filed: Apr. 4, 2023

(65) Prior Publication Data
US 2023/0239034 A1    Jul. 27, 2023

Related U.S. Application Data

(62) Division of application No. 17/221,608, filed on Apr. 2, 2021, now Pat. No. 11,637,617.

(51) Int. Cl.
*H04B 7/155*    (2006.01)
*H04B 17/318*   (2015.01)
*H04B 17/336*   (2015.01)

(52) U.S. Cl.
CPC .......... *H04B 7/155* (2013.01); *H04B 17/318* (2015.01); *H04B 17/336* (2015.01)

(58) Field of Classification Search
None
See application file for complete search history.

(56) References Cited

U.S. PATENT DOCUMENTS

2019/0268787 A1    8/2019   Guan et al.
2022/0086818 A1*   3/2022   Nam .............. H04W 72/21

* cited by examiner

*Primary Examiner* — Minh Trang T Nguyen
(74) *Attorney, Agent, or Firm* — Procopio, Cory, Hargreaves & Savitch LLP/Qualcomm

(57) ABSTRACT

A method, a computer-readable medium, and an apparatus are provided. The apparatus may be a repeater node. The apparatus may receive, at one or more first antennas of the node, a first signal via at least one first beam. The apparatus may measure, at one or more third antennas of the node, at least one of a power or a quality of at least one third beam. The at least one of the power or the quality of the at least one third beam may be measured at a same time as the first signal is received. The apparatus may forward, at one or more second antennas of the node, the first signal via at least one second beam.

18 Claims, 11 Drawing Sheets

REPEATERS CAPABLE OF SIMULTANEOUS REPEATING OPERATION AND POWER DETECTION

CROSS REFERENCE TO RELATED APPLICATION(S)

This application is a Divisional of U.S. Non-provisional application Ser. No. 17/221,608, entitled "REPEATERS CAPABLE OF SIMULTANEOUS REPEATING OPERATION AND POWER DETECTION" and filed Apr. 2, 2021, which is expressly incorporated by reference herein in its entirety.

BACKGROUND

Technical Field

The present disclosure relates generally to communication systems, and more particularly, to a repeating device in a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a node. The apparatus may receive, at one or more first antennas of the node, a first signal via at least one first beam. The apparatus may measure, at one or more third antennas of the node, at least one of a power or a quality of at least one third beam. The at least one of the power or the quality of the at least one third beam may be measured at a same time as the first signal is received. The apparatus may forward, at one or more second antennas of the node, the first signal via at least one second beam.

In an aspect of the disclosure, a method, a computer-readable medium, and an apparatus are provided. The apparatus may be a control entity. The apparatus may receive, from at least one node, a node capability of the at least one node. The node capability may correspond to a beam measurement being performed at a same time as at least one of a signal reception or a signal transmission. The apparatus may transmit, to the at least one node, an indication of at least one of a measurement configuration or a forwarding configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
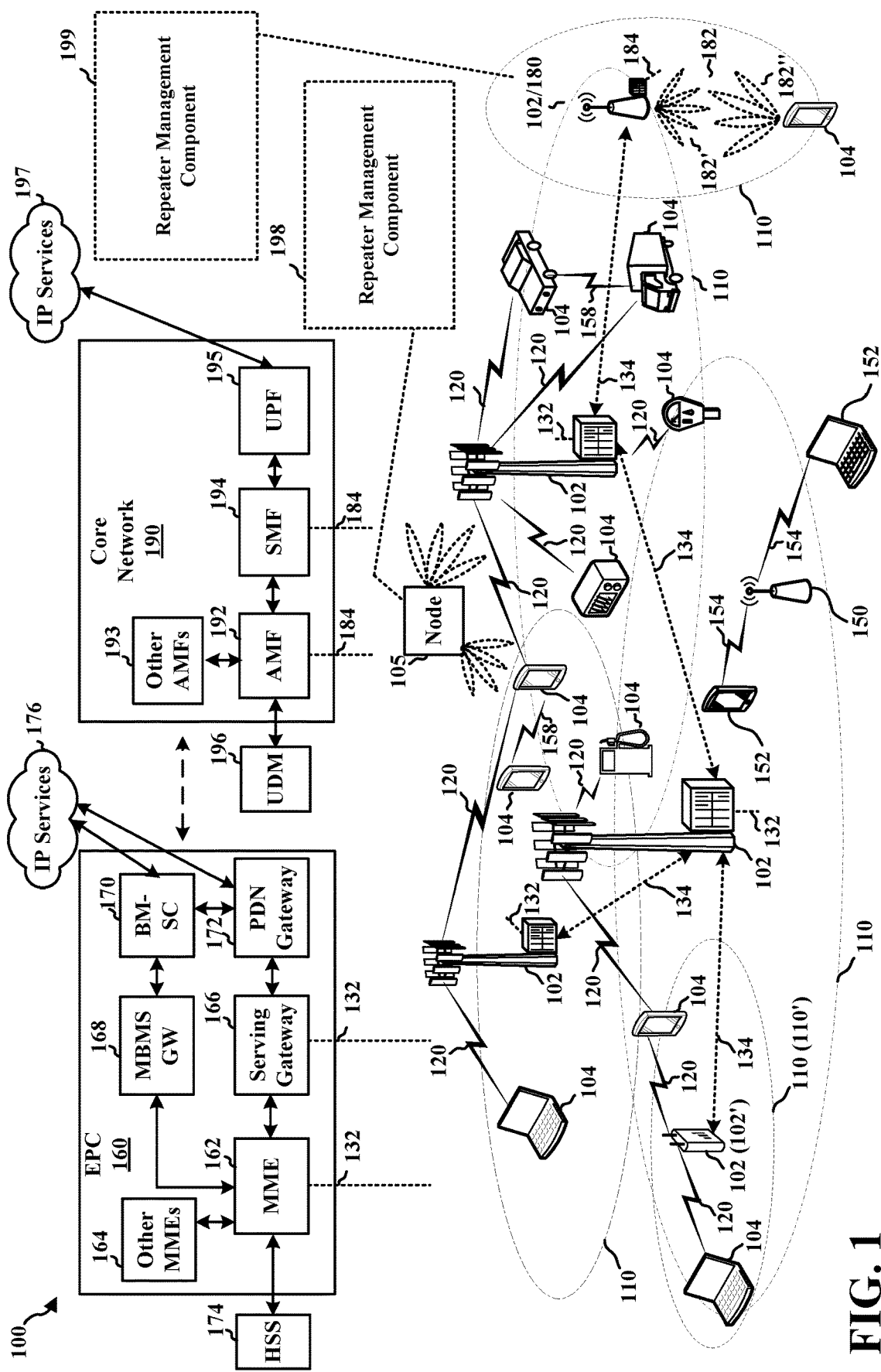
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the most suitable or best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the node may include a repeater management component 198 that may be configured to receive, at one or more first antennas of the node, a first signal via at least one first beam. The repeater management component 198 may be configured to measure, at one or more third antennas of the node, at least one of a power or a quality of at least one third beam. The at least one of the power or the quality of the at least one third beam may be measured at a same time as the first signal is received. The repeater management component 198 may be configured to forward, at one or more second antennas of the node, the first signal via at least one second beam. In certain aspects, the base station/control entity 180 may include a repeater management component 199 that may be configured to receive, from at least one node, a node capability of the at least one node. The node capability may correspond to a beam measurement being performed at a same time as at least one of a signal reception or a signal transmission. The repeater management component 199 may be configured to transmit, to the at least one node, an indication of at least one of a measurement configuration or a forwarding configuration. Although the following description may be focused on 5G NR, the concepts described herein may be applicable to other similar areas, such as LTE, LTE-A, CDMA, GSM, and other wireless technologies.

Figure 2:
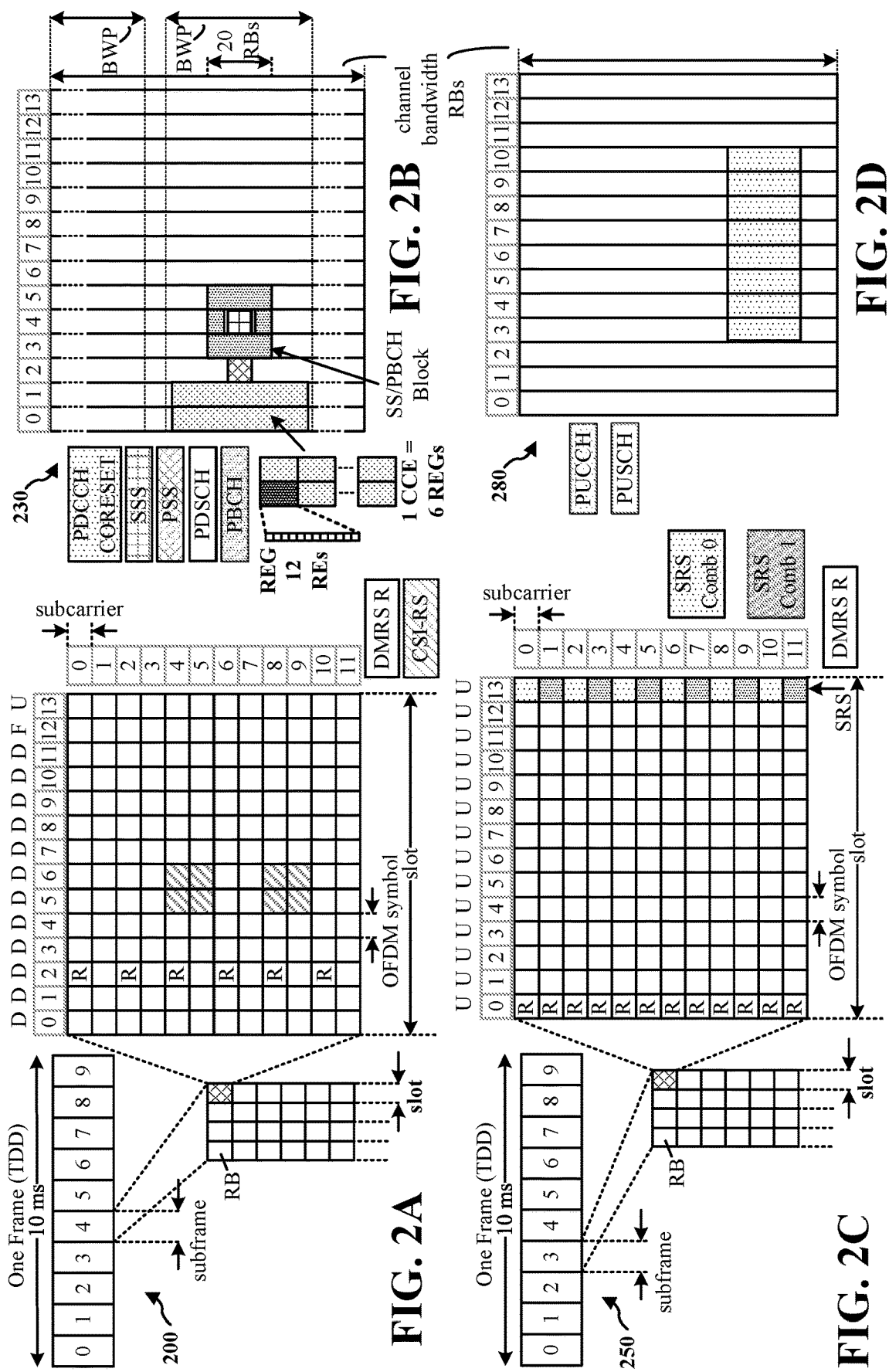
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^{82}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
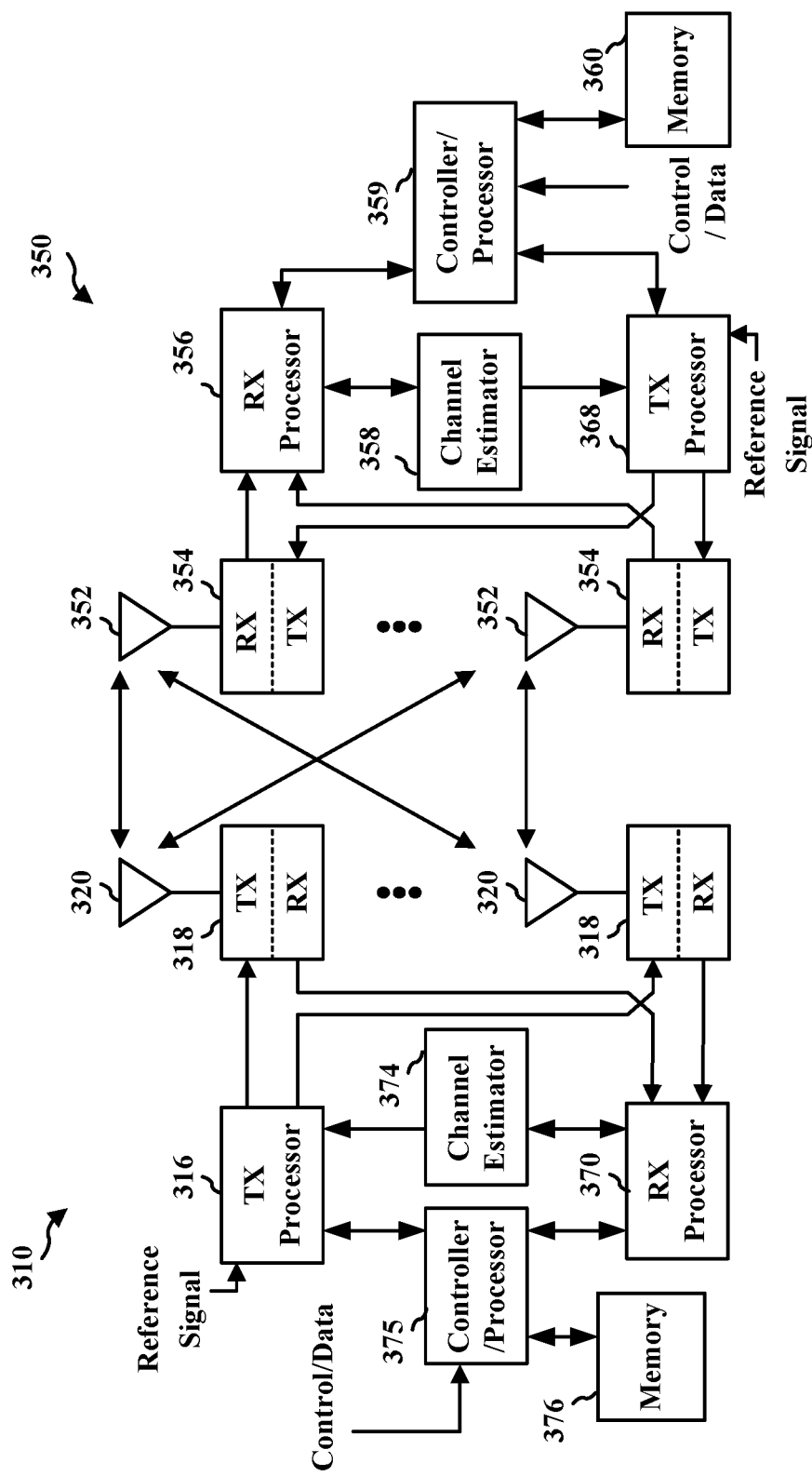
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 199 of FIG. 1.

Repeaters may be simple devices that may repeat (i.e., receive and forward, and optionally, amplify before forwarding) the wireless signals in a wireless communication system. Repeaters may be deployed in a wireless communication system at strategic locations to extend the coverage of the network nodes, avoid physical features that may block signals, and/or to provide additional spatial diversity and therefore more reliability and/or capacity. A traditional type repeater may not be dynamically configurable. For instance, a traditional type repeater may be preconfigured with fixed or semi-fixed configurations that may not be dynamically reconfigured during operation. The configurations may include any of power settings, configurations of transmit and/or receive beams, the forwarding direction setting (i.e., uplink or downlink), or the bandwidth configuration (e.g., the frequency band over which signals may be transmitted or received). On the other hand, a smart type repeater may have dynamically configurable properties. In particular, an "autonomously smart" repeater node may be able to perform learning during operation and reconfigure the properties or configurations (e.g., switch the forwarding direction, or switch the beams, etc.) on its own, as needed, whereas a "network-controlled smart" repeater node may be controlled remotely by a control node (entity) over a control interface between the repeater node and the control node (entity). In some configurations, a base station may double as a control node (entity), and the control signals may be transmitted via a PDCCH.

A repeater may be equipped with a power detector, such that the repeater may measure the received power (e.g., the analog received power in either radio frequency "RF" or intermediate frequency "IF"). Having the capability of power measurement may result in a number of benefits. For example, the repeater may be able to acquire TDD information (i.e., the repeater may be able to differentiate between downlink and uplink symbols) based on the power measurement. The repeater may be able to acquire a suitable beamforming configuration based on the power measurement. For example, the repeater may measure the received power on various receive beams, and may find a suitable beamforming configuration for subsequent communications based on the measured received power. Further, the repeater may be able to determine whether there is any incoming signal at all based on the power measurement. If there is no incoming signal, the repeater may determine to switch itself off to save power and reduce interference.

Figure 4B:
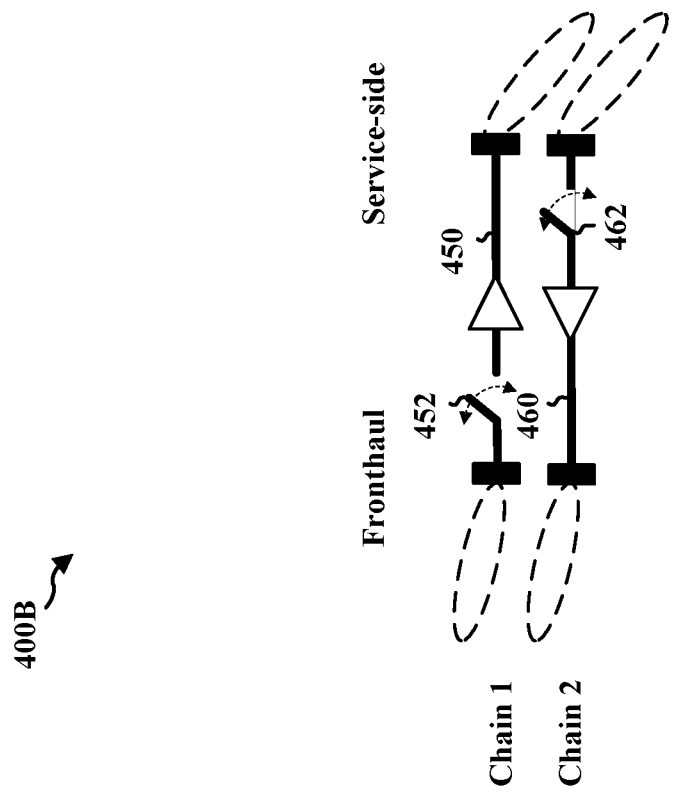
FIGS. 4A and 4B illustrate repeater architectures.
Figure 4A:
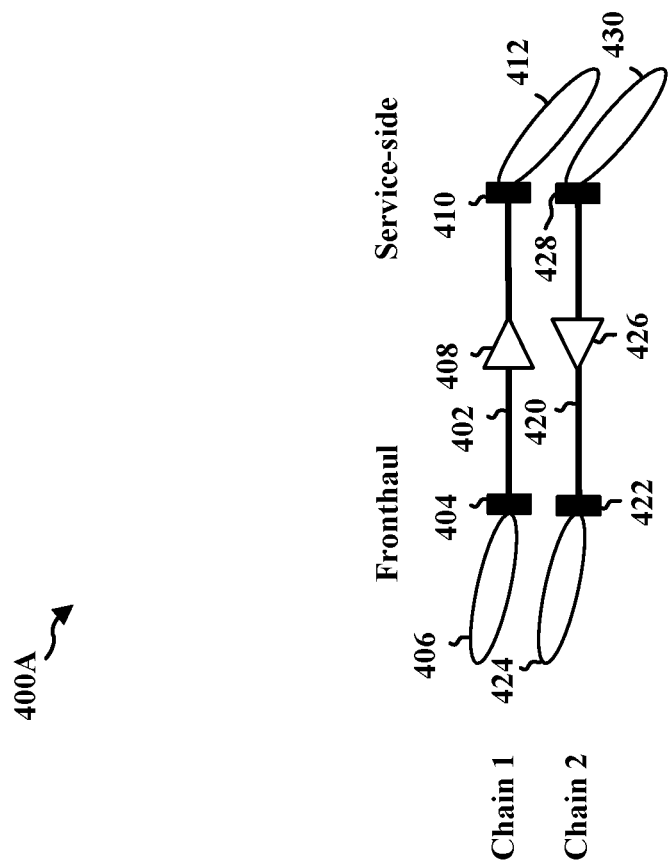

FIGS. 4A and 4B illustrate repeater architectures 400A and 400B, respectively. FIG. 4A illustrates an architecture 400A for a traditional, non-smart repeater with always-on bidirectional forwarding. In the first forwarding chain 402 (e.g., the downlink chain), at the fronthaul side, at least one downlink receive antenna 404 (which may include multiple antennas or an antenna containing multiple antenna elements for beamforming) may receive signals from the base station on a downlink receive beam 406. The received downlink signals may be amplified at a downlink amplifier 408. At the service side, at least one downlink transmit antenna 410 may transmit (forward) the amplified signals on a downlink transmit beam 412 to a UE. In the other direction, in the second forwarding chain 420 (e.g., the uplink chain), at the service side, at least one uplink receive antenna 428 may receive signals from the UE on an uplink receive beam 430. The received uplink signals may be amplified at an uplink amplifier 426. At the fronthaul side, at least one uplink transmit antenna 422 may transmit (forward) the amplified signals on an uplink transmit beam 424 to the base station. The traditional, non-smart repeater may be preconfigured with power, beam, forwarding direction, or bandwidth settings on a permanent or semi-permanent basis, and the bi-directional forwarding may be always-on.

FIG. 4B illustrates an architecture 400B for a TDD-aware repeater that may self-configure the direction of the forwarding operation by individually switching the chains on or off. The architecture 400B may be similar to the architecture 400A, except that a downlink switch 452 (or an attenuator) may be provided in the downlink chain 450, and an uplink switch 462 (or an attenuator) may be provided in the uplink chain 460. Therefore, for example, as the repeater is aware of the TDD pattern, during an uplink slot or symbol, the repeater may switch off the downlink chain 450 using the downlink switch 452 and switch on the uplink chain 460 using the uplink switch 462. The repeater may similarly switch off the uplink chain and switch on the downlink chain during a downlink slot or symbol. Accordingly, power may be saved, and interference may be reduced.

Throughout the process of TDD signal forwarding, the repeater in FIG. 4B may have one of the forwarding chains switched off based on the TDD pattern. This, however, may be inefficient, as it may represent an underutilization of resources. Therefore, according to aspects described herein, when the repeater uses one of the forwarding chains to forward TDD signals (in either downlink or uplink), the repeater may at the same time use the other chain, especially the at least one antenna included therein, to perform measurements. The measurement results may be used, for example, to fine-tune the beams of the repeater.

Figure 5:
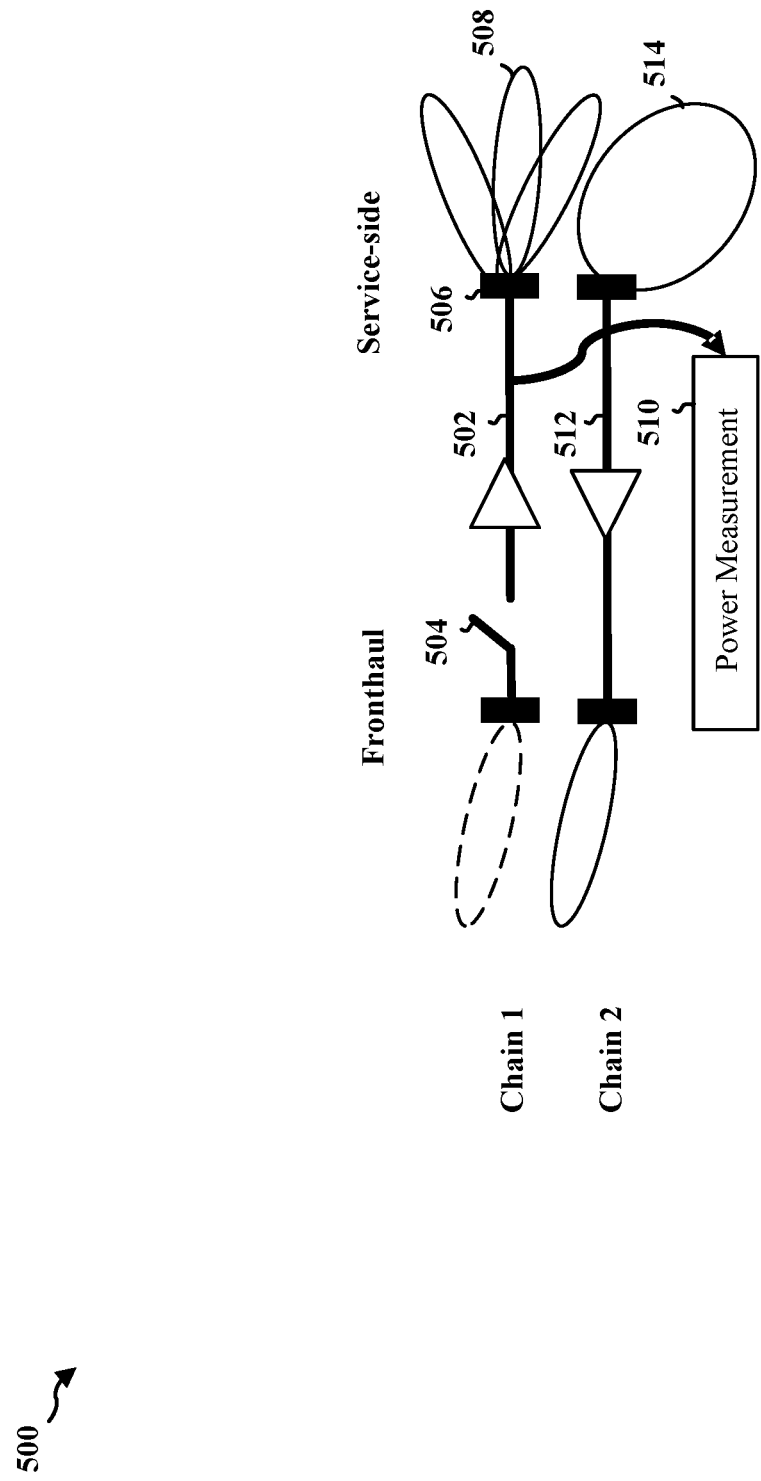
FIG. 5 illustrates an architecture of an example repeater.

FIG. 5 illustrates an architecture of an example repeater 500. During an uplink slot or symbol, the repeater may forward the uplink signals using the uplink forwarding chain 512. In particular, the uplink signals may be received on the uplink receive beam 514. Because the receive beam has not been fine-tuned, the receive beam 514 may be a preconfigured wider beam to provide broader coverage. The repeater may switch off the forwarding operation in the downlink chain 502 during the uplink slot or symbol using the switch 504. However, at the same time, the at least one downlink transmit antenna 506 may be repurposed as receive antenna (s), and may be used in combination with the power measurement component 510 (e.g., a power detector) to perform received power measurements. In particular, the repeater may control the at least one antenna 506 to perform a receive beam sweep facing the direction of the service side in order to find a better receive beam. To perform the receive beam sweep, narrower but stronger (e.g., with a better beamforming gain) receive beams 508 in different directions may be generated at the at least one antenna 506 in succession, and a received power may be measured at the power measurement component 510 based on each of the swept beams 508. A beam that results in a higher received power may be a better receive beam. The repeater may then fine-tune (train, refine) the uplink receive beam 514 based on the suitable beam direction found in the beam sweep. In particular, a narrower and stronger uplink receive beam 514 that is spatially quasi co-located (QCL'ed) with the most suitable or best beam 508 (e.g., having a same or similar beam direction) found in the beam sweep may be used in subsequent forwarding communications. This may be especially beneficial for autonomously-smart repeaters that, by default, may not be able to track the served UEs or to create a suitable receive beam on the service side.

Figure 6:
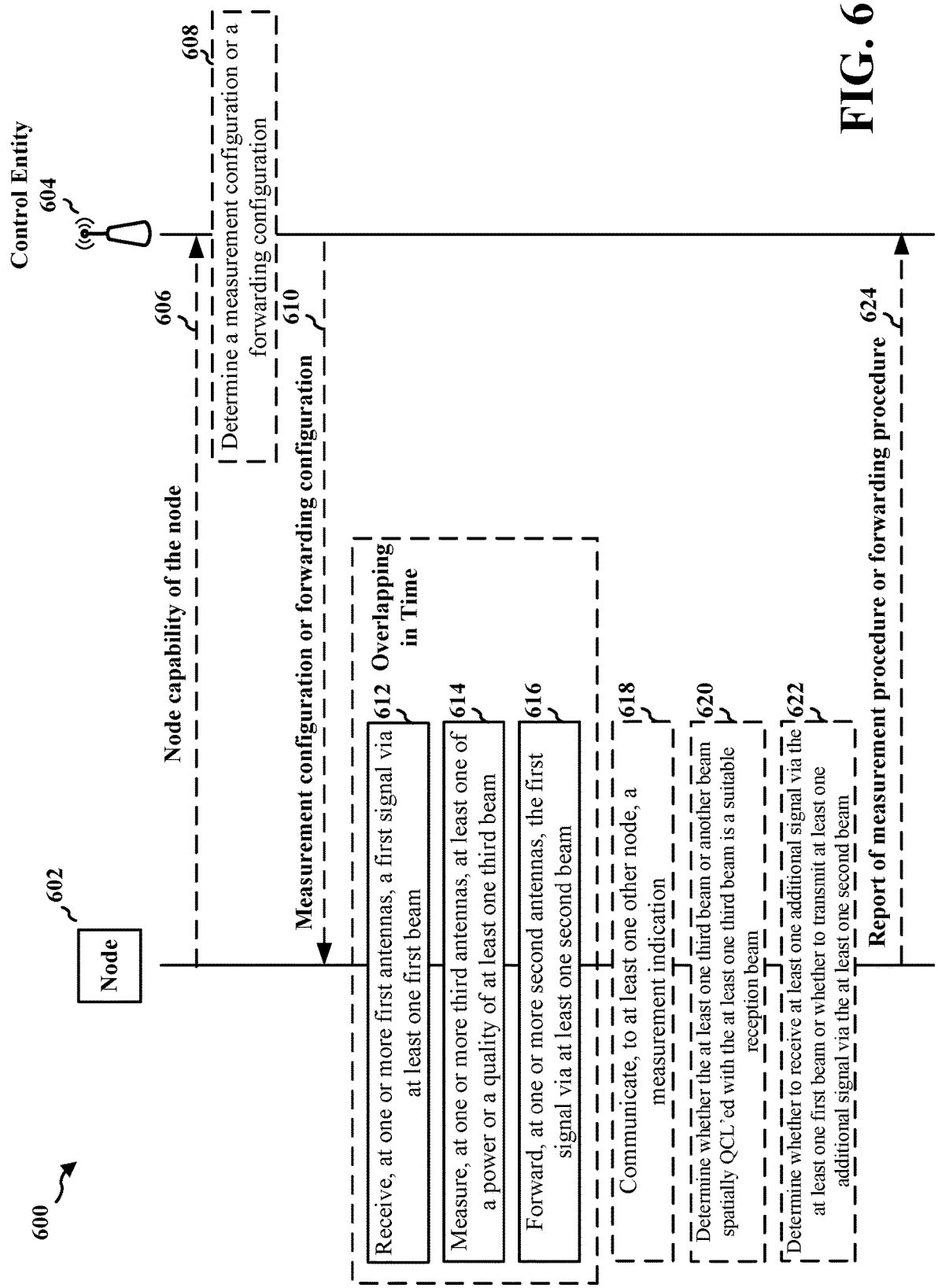
FIG. 6 illustrates a communication flow of a wireless communication system.
Figure 7:
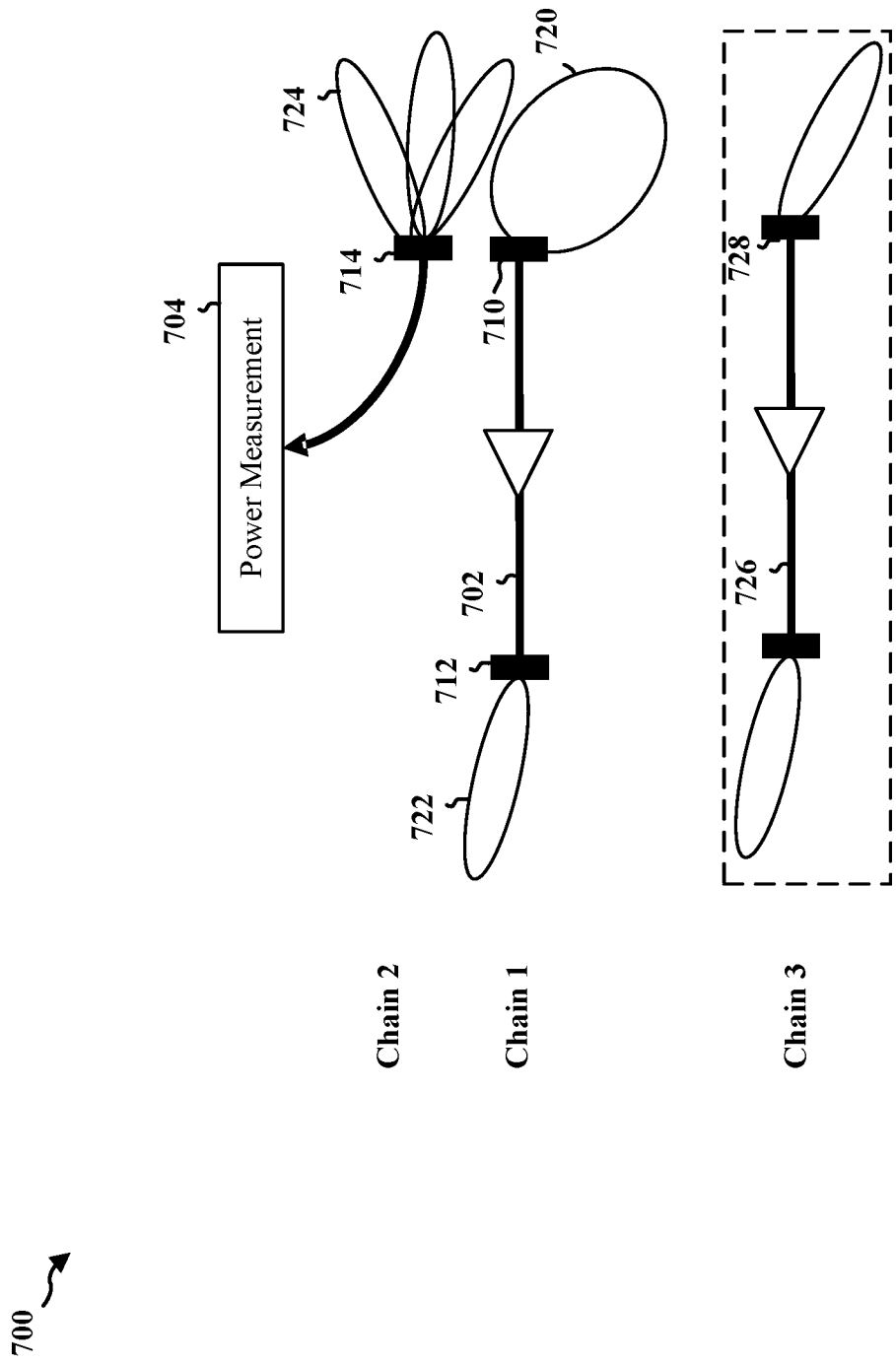
FIG. 7 illustrates an architecture of an example repeater.

FIG. 6 illustrates a communication flow 600 of a wireless communication system. The (repeater) node 602 may correspond to the node 105 and the repeater 500. The node 602 may include a repeater, a repeating device, a reflector, a reflecting device, or a reconfigurable intelligent surface (RIS), etc. The control entity 604 may correspond to the base station/control entity 102/180 and the base station/control entity 310. FIG. 7 illustrates an architecture of an example repeater 700. The repeater/node 700 may correspond to the node 105, the repeater 500 and the node 602. The repeater 700 may include a first chain 702, a second chain (not shown except for the at least one receive antenna 714), and a third chain 726.

At 606, the node 602/700 may transmit to at least one control entity 604, and the control entity 604 may receive from at least one node 602, a node capability of the node 602/700. The node capability may correspond to the measurement of the at least one of the power or the quality of the at least one third beam being performed at 614 below at a same time as the reception of the first signal at 612 below. In particular, the node capability may include the capability of the node 602/700 of the simultaneous forwarding and power measurement operations and the associated configurations (e.g., beams/antennas/antenna arrays that may support the simultaneous forwarding and power measurement operations, or the codebook that may be used for power measurement and the QCL relation to the codebook on other antennas/antenna arrays).

At 608, the control entity 604 may determine at least one of a measurement configuration or a forwarding configuration for the node 602/700 based at least in part on the received node capability of the node 602/700.

At 610, the node 602/700 may receive from the at least one control entity 604, and the control entity 604 may transmit to the at least one node 602, an indication of at least one of a measurement configuration or a forwarding configuration.

At 612, the node 602/700 may receive, at one or more first antennas 710 of the node 602/700, a first signal via at least one first beam 720. The first signal may be an uplink signal or a downlink signal. The first beam 720 may be one of a first uplink beam at a service side of the node or a first downlink beam at a fronthaul (FH) side of the node. The one or more first antennas 710 may be in a first chain 702 of the node 700. The first forwarding chain 702 may be an uplink forwarding chain or a downlink forwarding chain.

At 614, the node 602/700 may measure, using the power measurement component 704, at one or more third antennas 714 of the node 602/700, at least one of a power or a quality of at least one third beam 724. The at least one of the power or the quality of the at least one third beam 724 may be measured at 614 at a same time as the first signal is received on the first beam 720 at 612. The third beam 724 may be one of a third uplink beam at a service side of the node or a third downlink beam at an FH side of the node. The one or more third antennas 714 may be in a second chain (not shown) of the node 700. The at least one third beam 724 and the at least one first beam 720 may be spatially QCL'ed. The at least one of the power or the quality of the at least one third beam may include at least one of a received analog power (e.g., an RF power, an IF power, etc.), or a baseband channel or beam measurement result (e.g., a received signal strength indicator (RSSI), a reference signal received power (RSRP), a reference signal received quality (RSRQ), a signal-to-noise ratio (SNR), or a signal-to-interference-plus-noise ratio (SINR), etc.). The node 602/700 may perform a receive beam sweep with the at least one third beam 724 to find the most suitable or best receive beam/receive beam direction.

At 616, the node 602/700 may forward, at one or more second antennas 712 of the node 602/700, the first signal via at least one second beam 722. As with the one or more first antennas 710, the one or more second antennas 712 may be in a first chain 702 of the node 700. The at least one of the power or the quality of the at least one third beam 724 may be measured at 614 at a same time as the first signal is forwarded on the at least one second beam 722 at 616.

At 618, the node 602/700 may communicate, to at least one other node (e.g., another repeater node, the control entity 604, or any other suitable device), a measurement indication of the measured at least one of the power or the quality of the at least one third beam 724. The measurement indication of the measured at least one of the power or the quality of the at least one third beam 724 may be utilized by the at least one other node for any of a variety of purposes. The communication at 618 of the measurement indication may be in response to the node 602/700 receiving a configuration or a request from the control entity 604 to report the measurement results.

At 620, the node 602/700 may determine, based on the measurement, whether the at least one third beam 724 or another beam spatially QCL'ed with the at least one third beam 724 may be a suitable reception beam. A beam with a strong receive power or quality (e.g., above a threshold) may be a suitable reception beam. A most suitable or best third beam 724 described above or another beam at another forwarding chain (e.g., the first chain 702 or the third chain 726) that is trained and spatially QCL'ed with the most suitable or best third beam 724 (e.g., having a same or similar beam direction) may be a suitable reception beam. A suitable reception beam may be utilized in subsequent forwarding operations at the node 602/700 (for forwarding either to a same receiving device or to a different receiving device). It should be appreciated that a trained receive beam at the first chain 702 that is spatially QCL'ed with the most suitable or best third beam 724 may be generated with at least one first antenna 710, and a trained receive beam at the third chain 726 that is spatially QCL'ed with the most suitable or best third beam 724 may be generated with at least one fourth antenna 728. If even the most suitable or best third beam 724 is associated with an unsatisfactory receive power or quality, the at least one third beam 724 or another beam spatially QCL'ed with the at least one third beam 724 may not be a suitable reception beam.

At 622, the node 602/700 may determine, based on the measurement, at least one of whether to receive at least one additional signal via the at least one first beam 720 or whether to transmit at least one additional signal via the at least one second beam 722. For example, if, based on the measurement, the node 602/700 determines that no signal can be received with a sufficient quality, or no signal can be received at all with the at least one third beam 724, the node 602/700 may determine not to receive at least one additional signal via the at least one first beam 720 and/or not to transmit at least one additional signal via the at least one second beam 722.

At 624, the node 602/700 may transmit to at least one control entity 604, and the control entity 604 may receive from the at least one node 602, a report of at least one of a measurement procedure or a forwarding procedure. The report of the measurement procedure or the forwarding procedure may be utilized by the control entity 604 for any of a variety of purposes. The report of the measurement procedure may include the measurement results.

Figure 8:
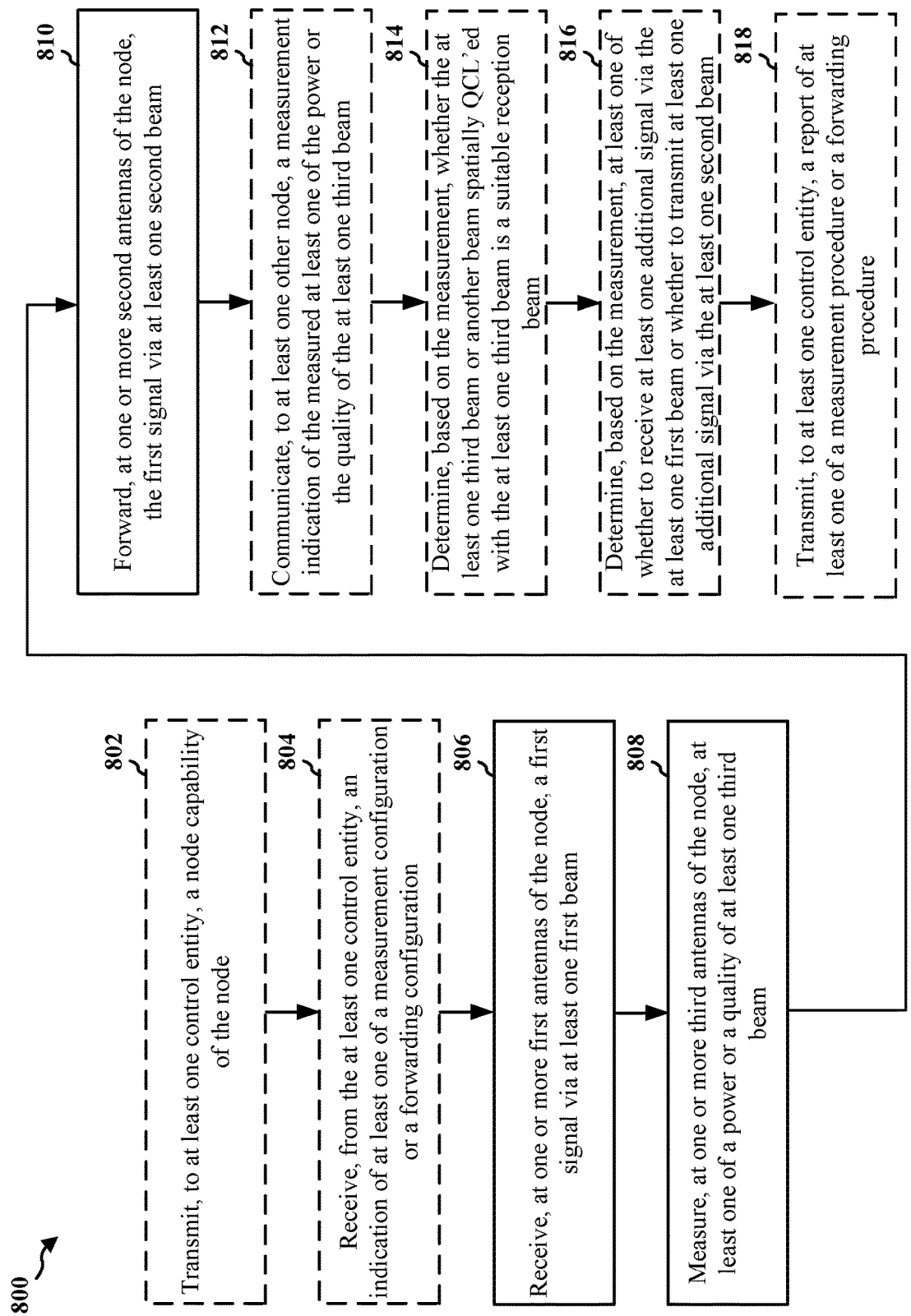
FIG. 8 is a flowchart of a method of wireless communication.

FIG. 8 is a flowchart 800 of a method of wireless communication. The method may be performed by a node (e.g., the node 105/602/700; the apparatus 1002). At 806, the node may receive, at one or more first antennas of the node, a first signal via at least one first beam. For example, 806 may be performed by the repeater management component 1040 in FIG. 10. Referring to FIGS. 6 and 7, at 612, the node 602/700 may receive, at one or more first antennas 710 of the node 602/700, a first signal via at least one first beam 720.

At 808, the node may measure, at one or more third antennas of the node, at least one of a power or a quality of at least one third beam. The at least one of the power or the quality of the at least one third beam may be measured at a same time as the first signal is received. For example, 808 may be performed by the repeater management component 1040 in FIG. 10. Referring to FIGS. 6 and 7, at 614, the node 602/700 may measure, at one or more third antennas 714 of the node 602/700, at least one of a power or a quality of at least one third beam 724. The at least one of the power or the quality of the at least one third beam 724 may be measured at 614 at a same time as the first signal is received at 612.

At 810, the node may forward, at one or more second antennas of the node, the first signal via at least one second beam. For example, 810 may be performed by the repeater management component 1040 in FIG. 10. Referring to FIGS. 6 and 7, at 616, the node 602/700 may forward, at one or more second antennas 712 of the node 602/700, the first signal via at least one second beam 722.

In one configuration, at 802, the node may transmit, to at least one control entity, a node capability of the node. The node capability may correspond to the measurement of the at least one of the power or the quality of the at least one third beam being performed at a same time as the reception of the first signal. For example, 802 may be performed by the repeater management component 1040 in FIG. 10. Referring to FIGS. 6 and 7, at 606, the node 602/700 may transmit, to at least one control entity 604, a node capability of the node 602/700. At 804, the node may receive, from the at least one control entity, an indication of at least one of a measurement configuration or a forwarding configuration. For example, 804 may be performed by the repeater management component 1040 in FIG. 10. Referring to FIGS. 6 and 7, at 610, the node 602/700 may receive, from the at least one control entity 604, an indication of at least one of a measurement configuration or a forwarding configuration.

In one configuration, the node capability may further include at least one of an antenna configuration, a chain configuration, a beam configuration, a signal forwarding capability, a beamforming capability, a signal power measurement capability, a signal quality measurement capability, a beam power measurement capability, or a beam quality measurement capability of the node.

In one configuration, the first beam may be one of a first uplink beam at a service side of the node or a first downlink beam at an FH side of the node.

In one configuration, the third beam may be one of a third uplink beam at a service side of the node or a third downlink beam at an FH side of the node.

In one configuration, the one or more first antennas and the one or more second antennas may be in a first chain of the node, and the one or more third antennas may be in a second chain of the node. Referring to FIG. 7, the one or more first antennas 710 and the one or more second antennas 712 may be in a first chain 702 of the node 700, and the one or more third antennas 714 may be in a second chain (not shown) of the node 700.

In one configuration, the at least one third beam and the at least one first beam may be spatially QCL'ed. Referring to FIG. 7, the at least one third beam 724 and the at least one first beam 720 may be spatially QCL'ed.

In one configuration, the node may determine a best third beam of the at least one third beam based on the measurement of the at least one of the power or the quality of the at least one third beam. The node may receive a further signal via at least one further beam that is spatially QCL'ed with the best third beam.

In one configuration, the at least one of the power or the quality of the at least one third beam may include at least one of an RF power, an IF power, an RSSI, an RSRP, an RSRQ, an SNR, or an SINR.

In one configuration, the at least one of the power or the quality of the at least one third beam may be measured at a same time as the first signal is forwarded. Referring to FIGS. 6 and 7, the at least one of the power or the quality of the at least one third beam 724 may be measured at 614 at a same time as the first signal is forwarded at 616.

In one configuration, the node may include a repeater, a repeating device, a reflector, a reflecting device, or a RIS.

At 812, the node may communicate, to at least one other node, a measurement indication of the measured at least one of the power or the quality of the at least one third beam. For example, 812 may be performed by the repeater management component 1040 in FIG. 10. Referring to FIGS. 6 and 7, at 618, the node 602/700 may communicate, to at least one other node, a measurement indication of the measured at least one of the power or the quality of the at least one third beam 724.

At 814, the node may determine, based on the measurement, whether the at least one third beam or another beam spatially QCL'ed with the at least one third beam may be a suitable reception beam. For example, 814 may be performed by the repeater management component 1040 in FIG. 10. Referring to FIGS. 6 and 7, at 620, the node 602/700 may determine, based on the measurement, whether the at least one third beam 724 or another beam spatially QCL'ed with the at least one third beam 724 may be a suitable reception beam.

At 816, the node may determine, based on the measurement, at least one of whether to receive at least one additional signal via the at least one first beam or whether to transmit at least one additional signal via the at least one second beam. For example, 816 may be performed by the repeater management component 1040 in FIG. 10. Referring to FIGS. 6 and 7, at 622, the node 602/700 may determine, based on the measurement, at least one of whether to receive at least one additional signal via the at least one first beam 720 or whether to transmit at least one additional signal via the at least one second beam 722.

At 818, the node may transmit, to at least one control entity, a report of at least one of a measurement procedure or a forwarding procedure. For example, 818 may be performed by the repeater management component 1040 in FIG. 10. Referring to FIGS. 6 and 7, at 624, the node 602/700 may transmit, to at least one control entity 604, a report of at least one of a measurement procedure or a forwarding procedure.

Figure 9:
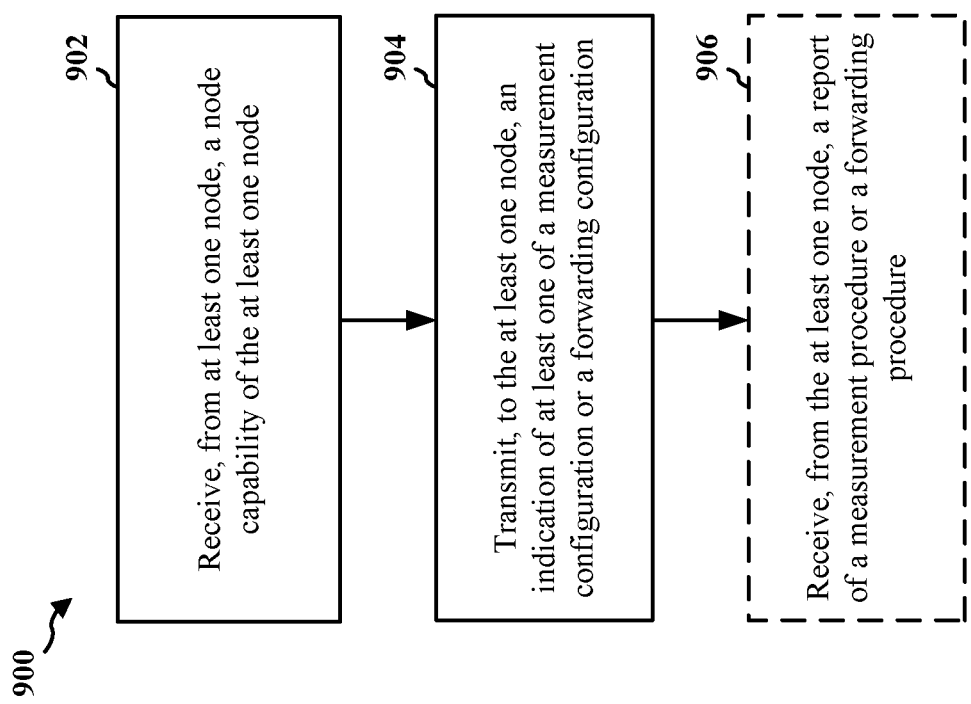
FIG. 9 is a flowchart of a method of wireless communication.

FIG. 9 is a flowchart 900 of a method of wireless communication. The method may be performed by a base station/control entity (e.g., the base station/control entity 102/180/310/604; the apparatus 1102). At 902, the control entity may receive, from at least one node, a node capability of the at least one node. The node capability may correspond to a beam measurement being performed at a same time as at least one of a signal reception or a signal transmission. For example, 902 may be performed by the repeater management component 1140 in FIG. 11. Referring to FIG. 6, at 606, the control entity 604 may receive, from at least one node 602, a node capability of the at least one node 602.

At 904, the control entity may transmit, to the at least one node, an indication of at least one of a measurement configuration or a forwarding configuration. For example, 904 may be performed by the repeater management component 1140 in FIG. 11. Referring to FIG. 6, at 610, the control entity 604 may transmit, to the at least one node 602, an indication of at least one of a measurement configuration or a forwarding configuration.

At 906, the control entity may receive, from the at least one node, a report of a measurement procedure or a forwarding procedure. For example, 906 may be performed by the repeater management component 1140 in FIG. 11. Referring to FIG. 6, at 624, the control entity 604 may receive, from the at least one node 602, a report of a measurement procedure or a forwarding procedure.

In one configuration, the node capability of the at least one node may include at least one of an antenna configuration, a chain configuration, a beam configuration, a signal forwarding capability, a beamforming capability, a signal power measurement capability, a signal quality measurement capability, a beam power measurement capability, or a beam quality measurement capability of the at least one node.

Figure 10:
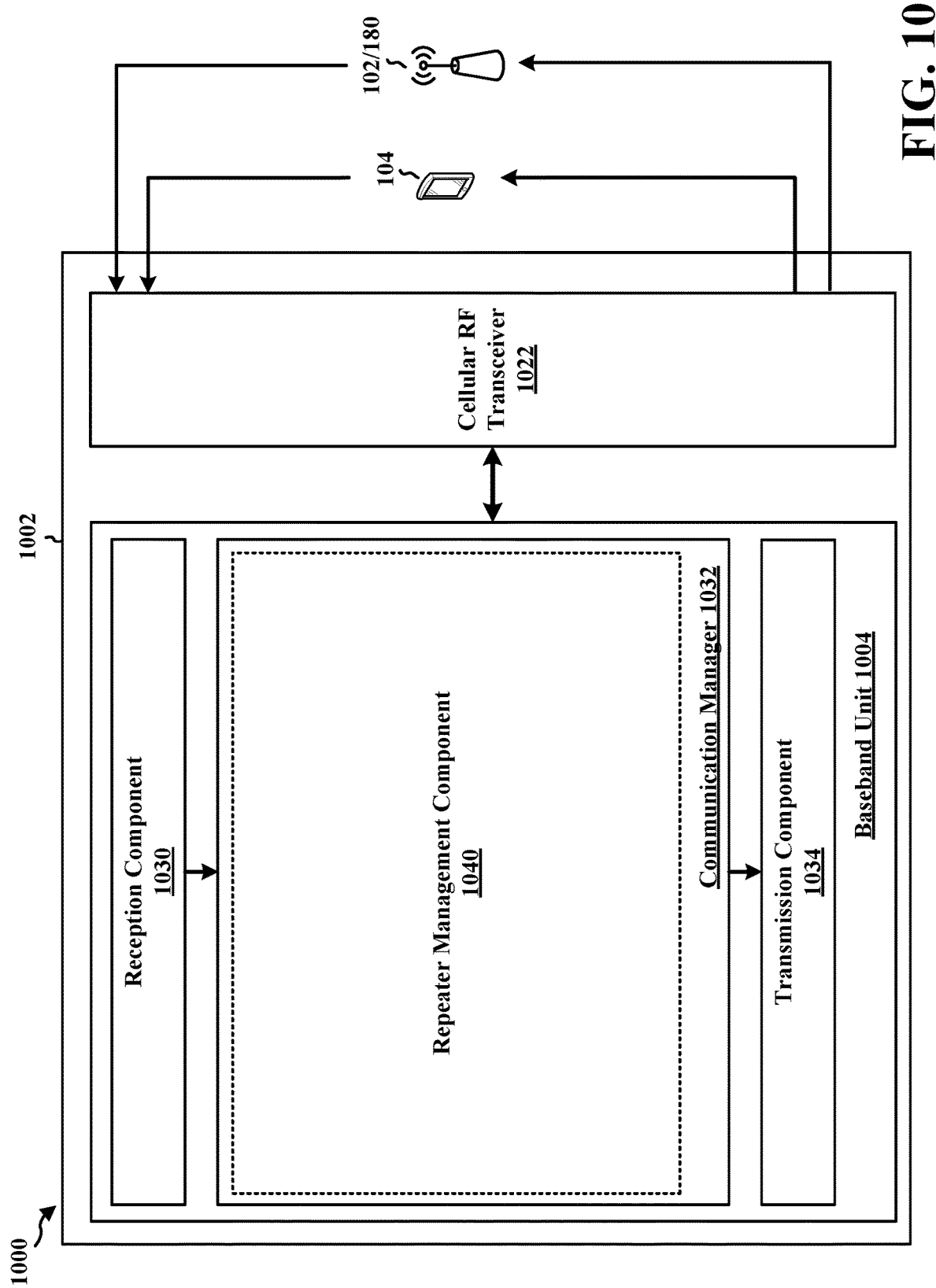
FIG. 10 is a diagram illustrating an example of a hardware implementation for an example apparatus.

FIG. 10 is a diagram 1000 illustrating an example of a hardware implementation for an apparatus 1002. The apparatus 1002 is a (repeater) node and includes a baseband unit 1004. The baseband unit 1004 may communicate through a cellular RF transceiver 1022 with the UE 104 or a base station 102/180. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a repeater management component 1040 that may be configured to transmit, to at least one control entity, a node capability of the node, e.g., as described in connection with 802 in FIG. 8. The repeater management component 1040 may be configured to receive, from the at least one control entity, an indication of at least one of a measurement configuration or a forwarding configuration, e.g., as described in connection with 804 in FIG. 8. The repeater management component 1040 may be configured to receive, at one or more first antennas of the node, a first signal via at least one first beam, e.g., as described in connection with 806 in FIG. 8. The repeater management component 1040 may be configured to measure, at one or more third antennas of the node, at least one of a power or a quality of at least one third beam, e.g., as described in connection with 808 in FIG. 8. The repeater management component 1040 may be configured to forward, at one or more second antennas of the node, the first signal via at least one second beam, e.g., as described in connection with 810 in FIG. 8. The repeater management component 1040 may be configured to communicate, to at least one other node, a measurement indication of the measured at least one of the power or the quality of the at least one third beam, e.g., as described in connection with 812 in FIG. 8. The repeater management component 1040 may be configured to determine, based on the measurement, whether the at least one third beam or another beam spatially QCL'ed with the at least one third beam is a suitable reception beam, e.g., as described in connection with 814 in FIG. 8. The repeater management component 1040 may be configured to determine, based on the measurement, at least one of whether to receive at least one additional signal via the at least one first beam or whether to transmit at least one additional signal via the at least one second beam, e.g., as described in connection with 816 in FIG. 8. The repeater management component 1040 may be configured to transmit, to at least one control entity, a report of at least one of a measurement procedure or a forwarding procedure, e.g., as described in connection with 818 in FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving, at one or more first antennas of the node, a first signal via at least one first beam. The apparatus 1002 may include means for measuring, at one or more third antennas of the node, at least one of a power or a quality of at least one third beam. The at least one of the power or the quality of the at least one third beam may be measured at a same time as the first signal is received. The apparatus 1002 may include means for forwarding, at one or more second antennas of the node, the first signal via at least one second beam.

In one configuration, the apparatus 1002 may include means for transmitting, to at least one control entity, a node capability of the node. The node capability may correspond to the measurement of the at least one of the power or the quality of the at least one third beam being performed at a same time as the reception of the first signal. In one configuration, the apparatus 1002 may include means for receiving, from the at least one control entity, an indication of at least one of a measurement configuration or a forwarding configuration. In one configuration, the node capability may further include at least one of an antenna configuration, a chain configuration, a beam configuration, a signal forwarding capability, a beamforming capability, a signal power measurement capability, a signal quality measurement capability, a beam power measurement capability, or a beam quality measurement capability of the node. In one configuration, the first beam may be one of a first uplink beam at a service side of the node or a first downlink beam at an FH side of the node. In one configuration, the third beam may be one of a third uplink beam at a service side of the node or a third downlink beam at an FH side of the node. In one configuration, the one or more first antennas and the one or more second antennas may be in a first chain of the node, and the one or more third antennas may be in a second chain of the node. In one configuration, the at least one third beam and the at least one first beam may be spatially QCL'ed. In one configuration, the apparatus 1002 may include means for determining a best third beam of the at least one third beam based on the measurement of the at least one of the power or the quality of the at least one third beam. The apparatus 1002 may include means for receiving a further signal via at least one further beam that is spatially QCL'ed with the best third beam. In one configuration, the at least one of the power or the quality of the at least one third beam may include at least one of an RF power, an IF power, an RSSI, an RSRP, an RSRQ, an SNR, or an SINR. In one configuration, the at least one of the power or the quality of the at least one third beam may be measured at a same time as the first signal is forwarded. In one configuration, the node may include a repeater, a repeating device, a reflector, a reflecting device, or a RIS. In one configuration, the apparatus 1002 may include means for communicating, to at least one other node, a measurement indication of the measured at least one of the power or the quality of the at least one third beam. In one configuration, the apparatus 1002 may include means for determining, based on the measurement, whether the at least one third beam or another beam spatially QCL'ed with the at least one third beam may be a suitable reception beam. In one configuration, the apparatus 1002 may include means for determining, based on the measurement, at least one of whether to receive at least one additional signal via the at least one first beam or whether to transmit at least one additional signal via the at least one second beam. In one configuration, the apparatus 1002 may include means for transmitting, to at least one control entity, a report of at least one of a measurement procedure or a forwarding procedure.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
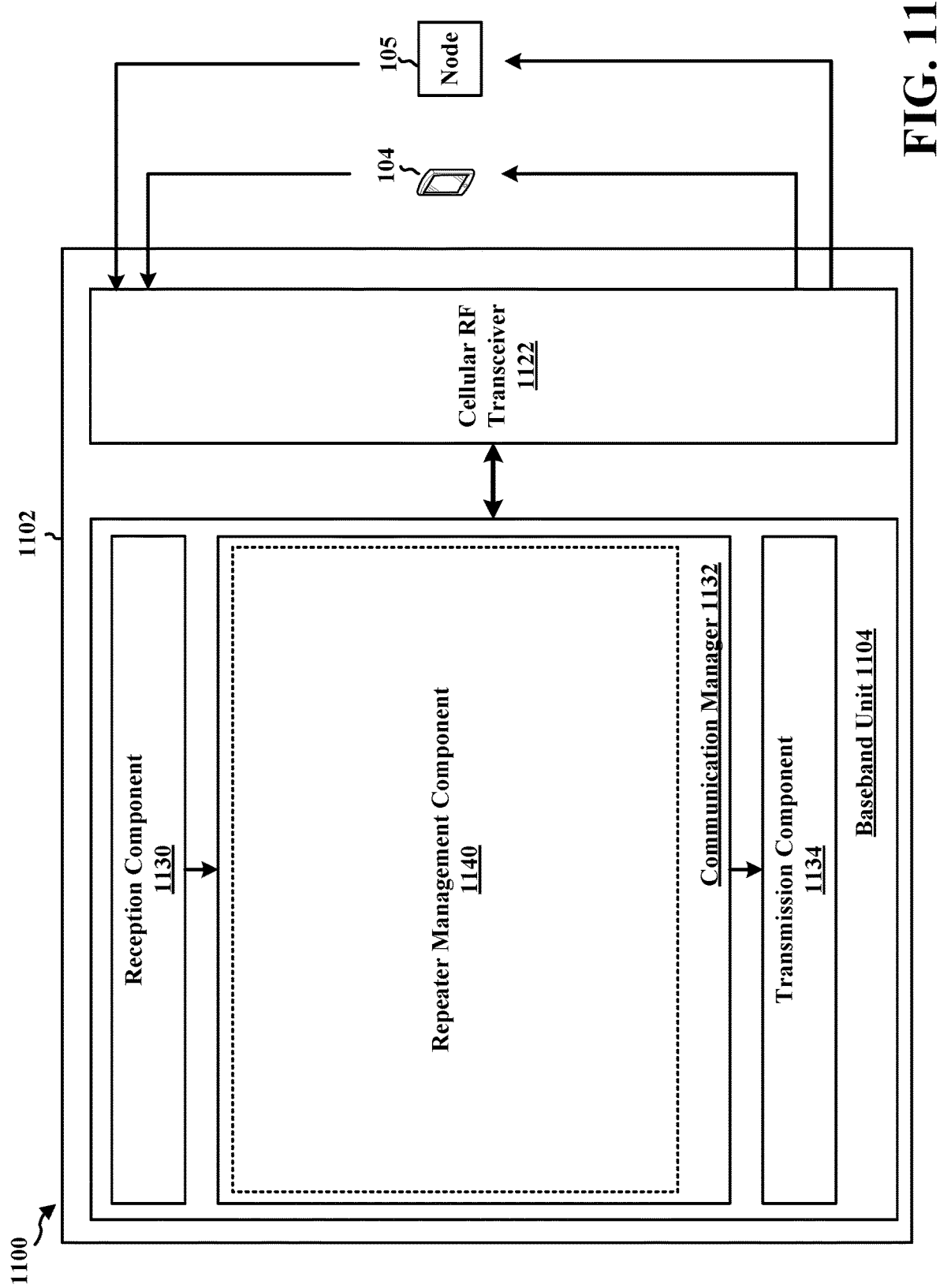
FIG. 11 is a diagram illustrating an example of a hardware implementation for an example apparatus.

FIG. 11 is a diagram 1100 illustrating an example of a hardware implementation for an apparatus 1102. The apparatus 1102 is a BS/control entity and includes a baseband unit 1104. The baseband unit 1104 may communicate through a cellular RF transceiver 1122 with the UE 104 or the (repeater) node 105. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a repeater management component 1140 that may be configured to receive, from at least one node, a node capability of the at least one node, e.g., as described in connection with 902 in FIG. 9. The repeater management component 1140 may be configured to transmit, to the at least one node, an indication of at least one of a measurement configuration or a forwarding configuration, e.g., as described in connection with 904 in FIG. 9. The repeater management component 1140 may be configured to receive, from the at least one node, a report of a measurement procedure or a forwarding procedure, e.g., as described in connection with 906 in FIG. 9.

The apparatus may include additional components that perform each of the blocks of the algorithm in the aforementioned flowcharts of FIGS. 6 and 9. As such, each block in the aforementioned flowcharts of FIGS. 6 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for receiving, from at least one node, a node capability of the at least one node. The node capability may correspond to a beam measurement being performed at a same time as at least one of a signal reception or a signal transmission. The apparatus 1102 may include means for transmitting, to the at least one node, an indication of at least one of a measurement configuration or a forwarding configuration. In one configuration, the apparatus 1102 may include means for receiving, from the at least one node, a report of a measurement procedure or a forwarding procedure. In one configuration, the node capability of the at least one node may include at least one of an antenna configuration, a chain configuration, a beam configuration, a signal forwarding capability, a beamforming capability, a signal power measurement capability, a signal quality measurement capability, a beam power measurement capability, or a beam quality measurement capability of the at least one node. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

According to aspects described herein, a repeater node may receive, at one or more first antennas of the node, a first signal via at least one first beam. The repeater node may measure, at one or more third antennas of the node, at least one of a power or a quality of at least one third beam. The at least one of the power or the quality of the at least one third beam may be measured at a same time as the first signal is received. The repeater node may forward, at one or more second antennas of the node, the first signal via at least one second beam. The measurement may be performed using at least one antenna in a forwarding chain that would otherwise be completely switched off. A receive beam sweep may be performed using the one or more third antennas and the at least one third beam to find the most suitable or best receive beam (e.g., a best third beam)/beam direction (e.g., a direction of a best third beam). In subsequent forwarding operations, the signals may be received on the most suitable or best receive beam or on another trained beam in another forwarding chain (e.g., a trained first beam in the forwarding chain including the one or more first antennas and the one or more second antennas), where the another trained beam (e.g., the trained first beam) may be spatially QCL'ed with the most suitable or best receive beam (e.g., the best third beam). Accordingly, better signal reception and forwarding may be achieved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a node, including: receiving, at one or more first antennas of the node, a first signal via at least one first beam; measuring, at one or more third antennas of the node, at least one of a power or a quality of at least one third beam, the at least one of the power or the quality of the at least one third beam being measured at a same time as the first signal is received; and forwarding, at one or more second antennas of the node, the first signal via at least one second beam.

Aspect 2 is the method of aspect 1, further including: transmitting, to at least one control entity, a node capability of the node, where the node capability corresponds to the measurement of the at least one of the power or the quality of the at least one third beam being performed at a same time as the reception of the first signal.

Aspect 3 is the method of aspect 2, further including: receiving, from the at least one control entity, an indication of at least one of a measurement configuration or a forwarding configuration.

Aspect 4 is the method of aspect 2, where the node capability further includes at least one of an antenna configuration, a chain configuration, a beam configuration, a signal forwarding capability, a beamforming capability, a signal power measurement capability, a signal quality measurement capability, a beam power measurement capability, or a beam quality measurement capability of the node.

Aspect 5 is the method of any of aspects 1 to 4, where the first beam is one of a first uplink beam at a service side of the node or a first downlink beam at an FH side of the node.

Aspect 6 is the method of any of aspects 1 to 5, where the third beam is one of a third uplink beam at a service side of the node or a third downlink beam at an FH side of the node.

Aspect 7 is the method of any of aspects 1 to 6, where the one or more first antennas and the one or more second antennas are in a first chain of the node, and the one or more third antennas are in a second chain of the node.

Aspect 8 is the method of any of aspects 1 to 7, where the at least one third beam and the at least one first beam are spatially QCL'ed.

Aspect 9 is the method of any of aspects 1 to 8, further including: determining a best third beam of the at least one third beam based on the measurement of the at least one of the power or the quality of the at least one third beam; and receiving a further signal via at least one further beam that is spatially QCL'ed with the best third beam.

Aspect 10 is the method of any of aspects 1 to 9, where the at least one of the power or the quality of the at least one third beam includes at least one of an RF power, an IF power, an RSSI, an RSRP, an RSRQ, an SNR, or an SINR.

Aspect 11 is the method of any of aspects 1 to 10, where the at least one of the power or the quality of the at least one third beam is measured at a same time as the first signal is forwarded.

Aspect 12 is the method of any of aspects 1 to 11, where the node includes a repeater, a repeating device, a reflector, a reflecting device, or a RIS.

Aspect 13 is the method of any of aspects 1 to 12, further including: communicating, to at least one other node, a measurement indication of the measured at least one of the power or the quality of the at least one third beam.

Aspect 14 is the method of any of aspects 1 to 13, further including: determining, based on the measurement, whether the at least one third beam or another beam spatially QCL'ed with the at least one third beam is a suitable reception beam.

Aspect 15 is the method of any of aspects 1 to 14, further including: determining, based on the measurement, at least one of whether to receive at least one additional signal via the at least one first beam or whether to transmit at least one additional signal via the at least one second beam.

Aspect 16 is the method of any of aspects 1 to 15, further including: transmitting, to at least one control entity, a report of at least one of a measurement procedure or a forwarding procedure.

Aspect 17 is a method of wireless communication at a control entity, including: receiving, from at least one node, a node capability of the at least one node, the node capability corresponding to a beam measurement being performed at a same time as at least one of a signal reception or a signal transmission; and transmitting, to the at least one node, an indication of at least one of a measurement configuration or a forwarding configuration.

Aspect 18 is the method of aspect 17, further including: receiving, from the at least one node, a report of a measurement procedure or a forwarding procedure.

Aspect 19 is the method of any of aspects 17 and 18, where the node capability of the at least one node includes at least one of an antenna configuration, a chain configuration, a beam configuration, a signal forwarding capability, a beamforming capability, a signal power measurement capability, a signal quality measurement capability, a beam power measurement capability, or a beam quality measurement capability of the at least one node.

Aspect 20 is an apparatus for wireless communication including at least one processor coupled to a memory and configured to implement a method as in any of aspects 1 to 19.

Aspect 21 is an apparatus for wireless communication including means for implementing a method as in any of aspects 1 to 19.

Aspect 22 is a computer-readable medium storing computer executable code, where the code when executed by a processor causes the processor to implement a method as in any of aspects 1 to 19.

What is claimed is:

1. An apparatus for wireless communication at a control entity, comprising:
    memory; and
    at least one processor coupled to the memory and configured to:
        receive, from at least one node, a node capability of the at least one node, the node capability corresponding to a beam measurement being performed at a same time as at least one of a signal reception or a signal transmission, wherein the beam measurement is based on a power or a quality of an uplink beam; and
        transmit, to the at least one node, an indication of at least one of a measurement configuration or a forwarding configuration.

2. The apparatus of claim 1, wherein the at least one processor is further configured to:
    receive, from the at least one node, a report of a measurement procedure or a forwarding procedure.

3. The apparatus of claim 1, wherein the node capability of the at least one node comprises at least one of an antenna configuration, a chain configuration, a beam configuration, a signal forwarding capability, a beamforming capability, a signal power measurement capability, a signal quality measurement capability, a beam power measurement capability, or a beam quality measurement capability of the at least one node.

4. The apparatus of claim 1, wherein the signal reception is associated with a first uplink beam at a service side of the at least one node or a first downlink beam at a fronthaul (FH) side of the at least one node.

5. The apparatus of claim 1, wherein the uplink beam comprises an uplink beam at a service side of the at least one node or a third downlink beam at a fronthaul (FH) side of the at least one node.

6. The apparatus of claim 1, wherein the at least one node comprises a repeater, a repeating device, a reflector, a reflecting device, or a reconfigurable intelligent surface (RIS).

7. A method of wireless communication at a control entity, comprising:
receiving, from at least one node, a node capability of the at least one node, the node capability corresponding to a beam measurement being performed at a same time as at least one of a signal reception or a signal transmission, wherein the beam measurement is based on a power or a quality of an uplink beam; and
transmitting, to the at least one node, an indication of at least one of a measurement configuration or a forwarding configuration.

8. The method of claim 7, further comprising:
receiving, from the at least one node, a report of a measurement procedure or a forwarding procedure.

9. The method of claim 7, wherein the node capability of the at least one node comprises at least one of an antenna configuration, a chain configuration, a beam configuration, a signal forwarding capability, a beamforming capability, a signal power measurement capability, a signal quality measurement capability, a beam power measurement capability, or a beam quality measurement capability of the at least one node.

10. The method of claim 7, wherein the signal reception is associated with a first uplink beam at a service side of the at least one node or a first downlink beam at a fronthaul (FH) side of the at least one node.

11. The method of claim 7, wherein the uplink beam comprises an uplink beam at a service side of the at least one node or a third downlink beam at a fronthaul (FH) side of the at least one node.

12. The method of claim 7, wherein the at least one node comprises a repeater, a repeating device, a reflector, a reflecting device, or a reconfigurable intelligent surface (RIS).

13. A non-transitory computer-readable medium storing computer executable code at a control entity, the code when executed by a processor causes the processor to:
receive, from at least one node, a node capability of the at least one node, the node capability corresponding to a beam measurement being performed at a same time as at least one of a signal reception or a signal transmission, wherein the beam measurement is based on a power or a quality of an uplink beam; and
transmit, to the at least one node, an indication of at least one of a measurement configuration or a forwarding configuration.

14. The non-transitory computer-readable medium of claim 13, the code further causing the processor to:
receive, from the at least one node, a report of a measurement procedure or a forwarding procedure.

15. The non-transitory computer-readable medium of claim 13, wherein the node capability of the at least one node comprises at least one of an antenna configuration, a chain configuration, a beam configuration, a signal forwarding capability, a beamforming capability, a signal power measurement capability, a signal quality measurement capability, a beam power measurement capability, or a beam quality measurement capability of the at least one node.

16. The non-transitory computer-readable medium of claim 13, wherein the signal reception is associated with a first uplink beam at a service side of the at least one node or a first downlink beam at a fronthaul (FH) side of the at least one node.

17. The non-transitory computer-readable medium of claim 13, wherein the uplink beam comprises an uplink beam at a service side of the at least one node or a third downlink beam at a fronthaul (FH) side of the at least one node.

18. The non-transitory computer-readable medium of claim 13, wherein the at least one node comprises a repeater, a repeating device, a reflector, a reflecting device, or a reconfigurable intelligent surface (RIS).

* * * * *